Figure 1:
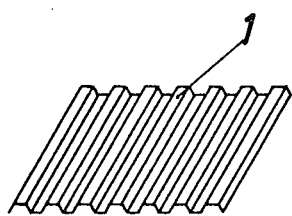

United States Patent [19]

Bequet

[11] 3,984,517

[45] Oct. 5, 1976

[54] PROCESS FOR LOCALLY FLATTENING AN ORIENTED CORRUGATED SHEET AND THE RESULTING PRODUCTS

[75] Inventor: Jean-Francois Bequet, Brussels, Belgium

[73] Assignee: Solvay E Cie, Brussels, Belgium

[22] Filed: Jan. 6, 1975

[21] Appl. No.: 538,524

Related U.S. Application Data

[63] Continuation of Ser. No. 348,263, April 4, 1973, abandoned.

[30] Foreign Application Priority Data

Apr. 20, 1972  France ............................. 72.14377

[52] U.S. Cl. .............................. 264/230; 264/295; 264/339
[51] Int. Cl.² ....................................... B29C 17/02
[58] Field of Search ............ 264/230, 295, 322, 339

[56] References Cited
UNITED STATES PATENTS

| | | | |
|---|---|---|---|
| 2,468,731 | 5/1949 | Borkland | 264/230 X |
| 2,889,651 | 6/1959 | Baldanza | 264/230 X |
| 2,897,546 | 8/1959 | Clapp | 18/56 |
| 3,341,643 | 9/1967 | Barnhart | 264/230 X |
| 3,414,181 | 12/1968 | Sloan | 264/230 X |
| 3,487,133 | 12/1969 | Lindsay | 264/291 X |
| 3,489,265 | 1/1970 | Puente | 264/295 X |
| 3,574,807 | 4/1971 | Heavener | 264/339 X |
| 3,767,752 | 10/1973 | Karlyn | 264/339 X |

FOREIGN PATENTS OR APPLICATIONS 891,505   3/1962   United Kingdom ................ 264/230

Primary Examiner—Richard R. Kucia
Attorney, Agent, or Firm—Spencer & Kaye

[57] ABSTRACT

The invention concerns a process for locally flattening an oriented corrugated thermoplastic sheet in order to produce finishing pieces such as ridge pieces and other roofing finishing components. According to this process, the sheet is locally heated in the regions in which it is to be flattened, to a temperature between the vitreous transition temperature and the plastic deformation temperature of the thermoplastic material of which it is composed, and subsequently cooled to a temperature below the vitreous transition temperature, while being prevented from shrinking.

19 Claims, 5 Drawing Figures

PROCESS FOR LOCALLY FLATTENING AN ORIENTED CORRUGATED SHEET AND THE RESULTING PRODUCTS

CROSS-REFERENCE TO RELATED APPLICATION

The application is a continuation of copending application Ser. No. 348,263, filed Apr. 4, 1973 now abandoned.

The present invention relates to a process for locally flattening an oriented corrugated sheet of thermoplastic material, and also to the products obtained by this process, for example finishing pieces for roofing or boarding.

It is well known that corrugated sheets of thermoplastic material, particularly those made from polyvinyl chloride compositions, have come into widespread use in the building industry.

The only disadvantage of these sheets is that their impact strength is low, and after ageing, may in certain cases become so poor that the material may be damaged in the event of exceptionally violent hail storms.

To enable this disadvantage to be effectively eliminated, we proposed, in our Belgian Patent Specifications No. 743,923, 743,922 and 766,911, that these corrugated sheets should be formed from flat sheets which had previously undergone an orientation treatment. It appears that oriented corrugated sheets obtained in this manner do in fact have substantially improved mechanical characteristics which make them suitable for use without risk in regions exposed to violent hail storms.

Furthermore, it is known that in the construction of covering means, e.g. boarding or roofing, by the use of corrugated sheets, it is necessary to use finishing pieces of more complex shapes, e.g. ridge elements, flashings, and fitting elements, particularly for making joints between two slopes or between a slope and a vertical wall or a gutter.

These finishing pieces generally have certain characteristics in common. More particularly, they generally have in at least one part, a corrugation similar to that of the corrugated sheets on to which they are to be fitted, and in at least one other part are flat and may have a turned-over edge.

Up to the present time these finishing pieces have been produced by a non-continuous thermoforming process consisting in heating a flat, non-oriented sheet beyond its vitreous transition temperature, and then applying the sheet, with the assistance of a vacuum, to a mould which imparts to it its final shape.

The finishing pieces obtained in this manner are for practical puroses not oriented, and consequently their mechanical strength, particularly their impact strength, remains fairly low, thus making it impossible to use them in roofing, particularly roofing of which the remainder is made up of oriented corrugated sheets.

It is of course possible, in principle, to produce these finishing pieces by thermoforming flat sheets which have previously undergone orientation treatment. However, in this case the vacuum is not in practice sufficient to impart to the thermoplastic sheet all the relief which it must be given. In order to overcome the orientation tensions in the sheet, in fact, it is necessary to effect the thermoforming with the use of a countermould and with the application of high pressure. Consequently, the thermoforming equipment which must be used is necessarily very expensive and the cost of the finishing pieces obtained is very high.

We have now developed a simple and economical process for producing oriented finishing pieces or other oriented products from corrugated sheets of thermoplastic material oriented at least in the transverse direction to the corrugation.

In the process of the present invention, a corrugated sheet of thermoplastic material, which is oriented at least in the transverse direction to the corrugation, is heated locally, in the regions in which it is to be flattened, to a temperature between the vitreous transition temperature and the plastic deformation temperature of the thermoplastic material of which it is composed, and subsequently cooled to a temperature below the vitreous transition temperature, while being prevented from shrinking.

When necessary, for example in order to make ridge pieces, the sheet may in addition be deformed mechanically, in the regions in which it is heated, between the heating, and cooling stages. This deformation may comprise folding the sheet with respect to a folding axis, or bending it into a curved configuration, for example.

The heating of the sheet is preferably maintained until it has resumed a flat shape in the heated regions, assuming that it is not to be deformed as just mentioned.

During the heating, and until the end of the cooling stage, it is essential, as already indicated, that the sheet should be secured at the edges of the heated regions to prevent the shrinking of the sheet following the release of the orientation tensions in the heated regions.

A holding frame may be used to secure the sheet for this purpose, and it is advantageously made of a material which is a poor conductor of heat, for example wood.

The temperature to which the sheet should be heated to permit the desired deformation depends on the nature of the material of which it is composed. As stated earlier, this temperature must be between the vitreous transition temperature (or second order transition temperature) of the material in question and the plastic deformation temperature of this material. The optimum working temperature can be determined experimentally in a very simple manner by subjecting a sample of oriented corrugated sheet to progressive heating while it is secured in a holding frame and noting the temperature which has been reached when the disappearance of the corrugations occurs in the heated regions of the sheet. Care must in all cases be taken not to reach or excced the plastic deformation temperature of the material of which the oriented corrugation sheet is composed, because if this happens the corrugated sheet will tear because of the release of the orientation tensions.

On the other hand, provided that care is taken not to reach this temperature, we have found that in the heated regions the corrugated sheet retains 100 percent of any original orientation in the direction of the corrugation, and the orientation in the transverse direction to the corrugation is only partially reduced. Consequently the corrugated sheet retains very satisfactory mechanical properties in the flattened region.

As stated earlier, the sheet may be mechanically deformed between the heating and cooling stages, for example by folding or bending. If, however, the sheet is secured in a holding frame, a jointed frame is generally required to enable the folding, bending or other deforming operation to be carrier out.

These deforming operations may nevertheless be carried out more easily after the sheet has been cooled and taken out of its frame or other shrinking-preventing means.

We have in fact found that it is possible for the sheet to be mechanically deformed by using the cold-forming techniques which are well established in the metal industry.

Cooling is preferably effected to a temperature below 65°C.

An oriented corrugated sheet deformed in accordance with the present invention can also be easily folded, after cooling and removal from the holding frame or other shrinking-preventing means, by producing very localized heating along the desired folding axis by means of a hot wire, which preferably has a diameter of from 0.5 to 5 mm. We have in fact found that the shrinkage undergone by the sheet at the axis defined by the wire need not exceed a few millimeters and can consequently remain within acceptable limits.

The term "oriented corrugated sheet" is to be understood to include oriented corrugated sheets of any thickness, although the process is preferably applied to oriented corrugated sheets having a thickness of the order of 1 mm.

Also, the expression "corrugated sheet oriented at least in the transverse direction to the corrugation" is to be understood to include corrugated sheets prepared by corrugating flat sheets which have previously undergone drawing treatment to the extent of 30 – 150 percent, preferably 60 – 120 percent, in the direction perpendicular to the corrugation and at a temperature such that this drawing induces orientation tensions which are preserved by the cooling of this sheet.

We prefer, however, to use bioriented corrugated sheets obtained by corrugating flat sheets which have previously undergone, under the conditions mentioned above, drawing treatment to the extent of 30 – 150 percent, preferably 60 – 120 percent in two directions at right angles to one another, one of these directions being perpendicular to the corrugation. We have in fact found that in this case products having particularly good mechanical properties are finally obtained.

With regard to the nature of the thermoplastic material of which the oriented corrugated sheet modified by the process of the invention is composed, it may be stated that any thermoplastic material suitable for producing an oriented corrugated sheet per se may be used. We nevertheless prefer to use oriented corrugated sheets composed of vinyl chloride resin compositions, which may be based on polyvinyl chloride or on vinyl chloride copolymers containing more than 50 mole % vinyl chloride in their molecule.

If the bioriented corrugated sheets are composed of a vinyl chloride resin composition, the local heating of the sheet to be deformed is desirably so conducted as to bring the heated regions to a temperature higher than 80°, preferably between 110° and 130°C.

It should be noted that although the process of the invention is particularly suitable for the production of finishing pieces for roofing or boarding, it is also suitable for producing a variety of other articles, e.g. roof lights and garden frames, from oriented corrugated sheets.

Finally, the oriented corrugated sheets which can be used in accordance with the invention may have any profile, for example a sinusoidal or trapezium-shaped profile.

The invention is illustrated by the following description of one specific procedure in accordance with it, which relates to the production of a ridge piece. It is to be understood that this is given solely as an illustration, and does not in any way limit the scope of the present invention.

Figure 4:
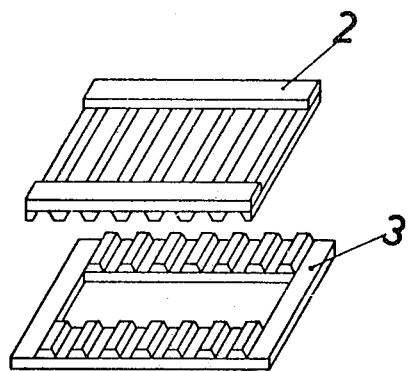
Figure 3:
Figure 2:
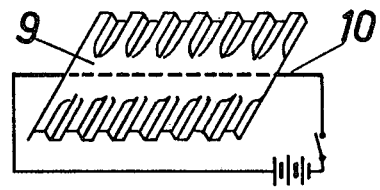
Figure 5:
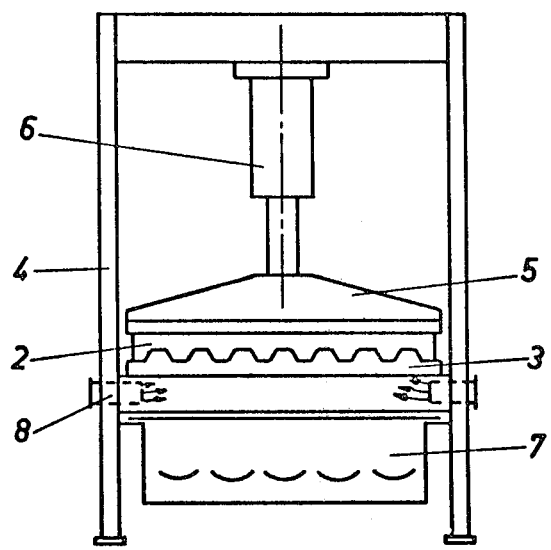

In this description, reference will be made to the Figures of the accompanying diagrammatic drawings, in which:

FIGS. 1 to 3 illustrate, in perspective views, the changes undergone by a starting material constituted by a bioriented corrugated sheet, FIG. 4 is a perspective view of a holding frame, and FIG. 5 is a front elevation of an apparatus used to carry out the first stage of the production of the ridge piece.

As can be seen in FIG. 1, the starting material is constituted by a corrugated sheet 1 having a trapezium-shaped profile; the sheet 1 is of polyvinyl chloride, has a thickness of 1 mm, and is bioriented. This sheet 1 is obtained by corrugating a flat sheet which has previously undergone biaxial drawing to an extent of from 100 to 105 percent.

For the purpose of deformation, the sheet is placed in a holding frame comprising an upper part 2 and a lower part 3, as illustrated in FIG. 4, these parts extending over the whole of the sheet 1 apart from the regions to be flattened. The holding frame is made of wood.

The frame together with the sheet 1 is then placed in the apparatus shown diagrammatically in FIG. 5, in such a position that its lower part 3 rests on supports fixed to the frame 4 of the apparatus.

The pressure necessary for keeping the sheet 1 in place in its frame during its deformation is obtained from a platen 5 which bears against the upper part 2 of the frame and is mounted on a hydraulic ram 6 capable of exerting a thrust of the order of 10 tons.

As soon as the sheet 1, in its frame, has been secured, heating elements 7, e.g. an array of regularly spaced infrared-emitting resistors, are brought into operation so as to bring the middle regions of the sheet 1 to a temperature of 115°C. As soon as these regions have reached this temperature, it is found that the corrugations disappear and that these middle regions of the sheet become flat at the end of about 15 seconds. At this moment the heating is stopped and the sheet is cooled, for example by a blast of cold air supplied through pipes 8 whose openings are placed around the bottom periphery of the frame.

When the sheet 1 has been sufficiently cooled, for example when the regions which had been heated are below 65°C, the platen 5 is raised and the sheet released, the sheet having at this stage the shape shown in FIG. 2. It will be seen from this Figure that the sheet has a flat central band 9, although the two ends, which were protected by the holding frame, have retained their corrugations.

A hot metal wire 10 (FIG. 2) is then applied along the middle of the flat central band 9 of the deformed sheet, in order to soften the thermoplastic material along the axis with respect to which the sheet is to be folded in order to form the ridge piece shown in FIG. 3.

Instead of being folded along the middle of its flat central band 9, the sheet may be cut through and two fitting elements thus obtained.

What we claim is:

1. A process for locally flattening a corrugated sheet of thermoplastic material of vinyl chloride resin, formed from a flat sheet which has previously undergone an orientation treatment, which comprises:
   a. locally heating the sheet, in the regions in which it is to be flattened, to a temperature between the vitreous transition temperature and the plastic deformation temperature of the thermoplastic material of which it is composed to locally flatten the sheet in the heated regions while preventing the sheet from flattening in the regions which are not to be flattened to retain corrugations therein, and
   b. subsequently cooling the sheet to a temperature below the vitreous transition temperature, while preventing the sheet from shrinking to form an oriented corrugated sheet having flat portions.

2. A process according to claim 1, in which the sheet is in addition deformed mechanically, in the regions in which it is heated, between the heating and cooling stages.

3. A process according to claim 2, in which the sheet is mechanically deformed by folding it with respect to a folding axis.

4. A process according to claim 2, in which the sheet is mechanically deformed by bending it into a curved configuration.

5. A process according to claim 1, in which the sheet is heated locally to a temperature higher than 80°C.

6. A process according to claim 5, in which the sheet is heated locally to a temperature between 110° and 130°C.

7. A process according to claim 1, in which the sheet is secured during its heating by a holding frame.

8. A process according to claim 7, in which the frame employed is of wood.

9. A process according to claim 7, in which the frame employed is jointed.

10. A process according to claim 1, in which the sheet is in addition deformed mechanically after cooling.

11. A process according to claim 10, in which the sheet is mechanically deformed by cold folding.

12. A process according to claim 10, in which the sheet is deformed mechanically by folding after the folding region has been heated by bringing it into contact with a hot wire of a diameter between 0.5 and 5 mm.

13. The process of claim 1 wherein the corrugated sheet that is to be flattened is bioriented.

14. The process of claim 7 wherein the holding frame extends over the whole of the corrugated sheet except for the regions of the corrugated sheet which are to be flattened.

15. The process of claim 14 wherein the holding frame is corrugated.

16. The process of claim 1, wherein the corrugated sheet that is to be flattened is oriented in a direction parallel to the corrugation, and upon flattening retains 100 percent of its orientation in the direction parallel to the corrugation.

17. The process of claim 13, wherein the bioriented corrugated sheet that is to be flattened is oriented in a first direction which is perpendicular to the corrugation and a second direction which is at a right angle to the first direction, and upon flattening retains 100 percent of its orientation in the second direction.

18. The process of claim 17, wherein upon flattening, the orientation in the first direction is only partially reduced.

19. The process according to claim 1, wherein the sheet to be flattened is oriented in a direction transverse to the corrugations, and upon flattening, the orientation in said transverse direction is only partially reduced.

* * * * *